Jan. 12, 1960     C. R. CASINI     2,920,611
ROTARY INTERNAL COMBUSTION ENGINE WITH RADIAL
CYLINDERS AND VARIABLE STROKE
Filed Aug. 1, 1956     4 Sheets-Sheet 1
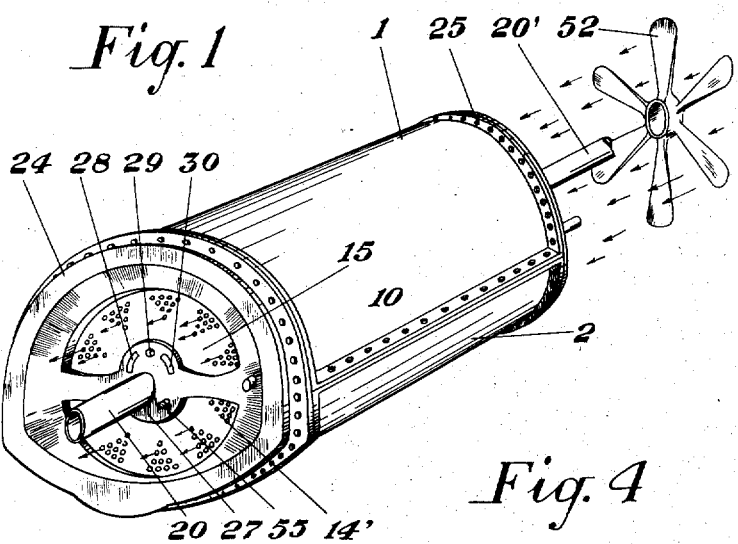
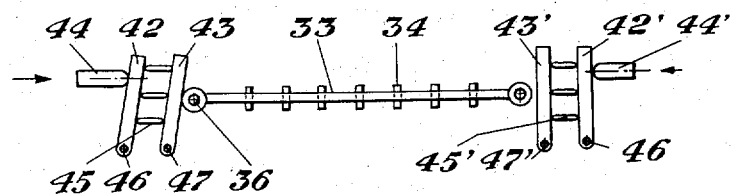
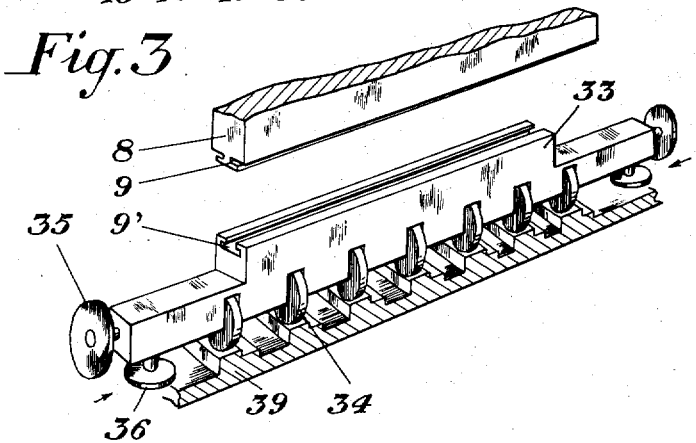
INVENTOR.
C. R. Casini
BY
ATTORNEYS

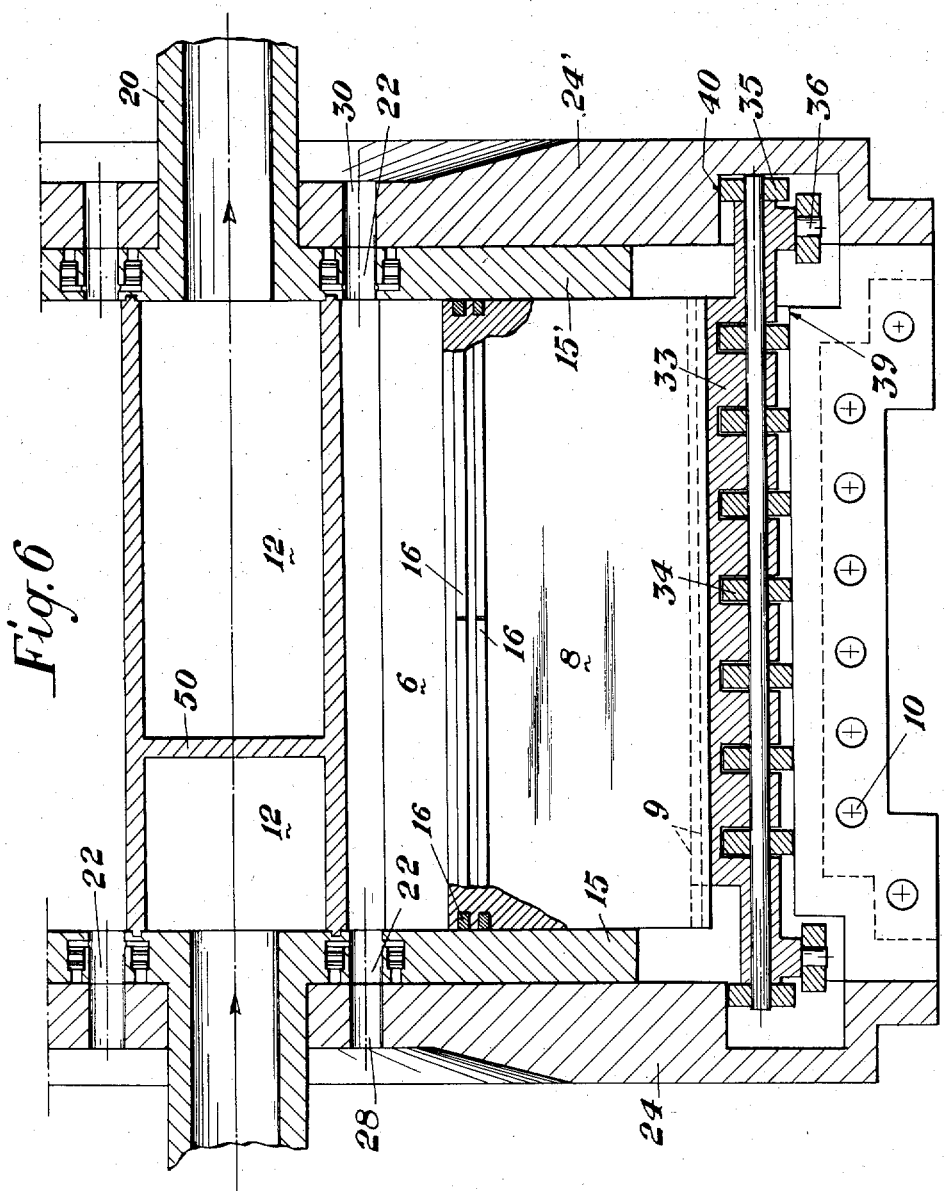

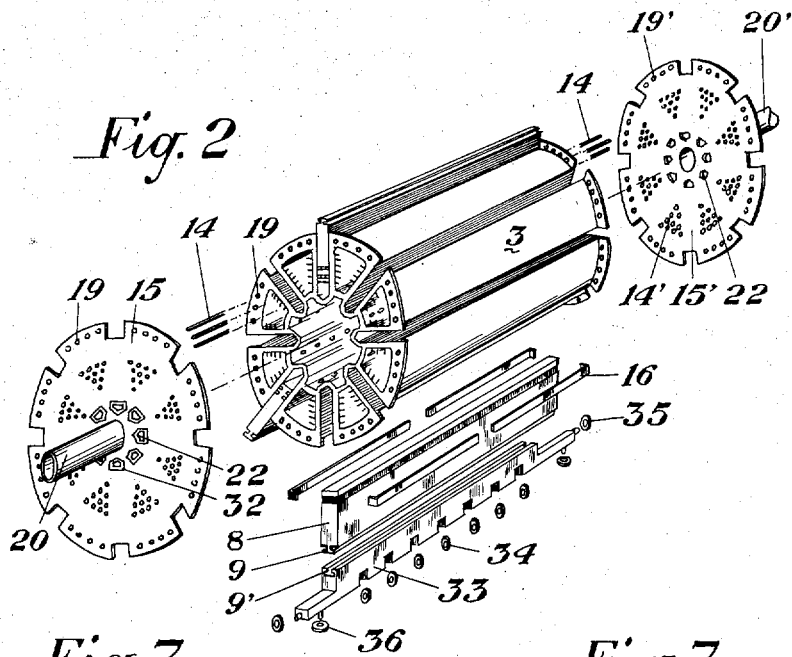
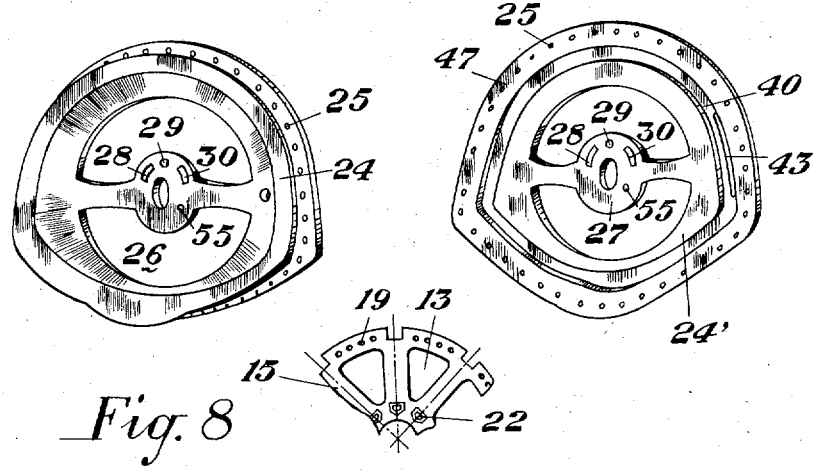

United States Patent Office 2,920,611
Patented Jan. 12, 1960

2,920,611

ROTARY INTERNAL COMBUSTION ENGINE WITH RADIAL CYLINDERS AND VARIABLE STROKE

Carlo Romano Casini, Kobayat-Akkar, Lebanon

Application August 1, 1956, Serial No. 601,442

Claims priority, application Lebanon September 14, 1955

3 Claims. (Cl. 123—44)

It is a known fact that the efficiency of the Otto-cycle internal combustion engines increases as the compression ratio increases. However, since these engines must in a great many cases operate over a broad speed range, when they must develop a power substantially lower than that for which they are designed, their efficiency, the initial and final cylinder capacities being equal, is reduced in the same proportion as the compression ratio is reduced.

This actual loss of efficiency which occurs in the most common type of engine constitutes a serious economic loss, even though in practice part of the loss of efficiency due to the reasons outlined above is made good by the fact that the small quantity of mixture taken in by the engine at low speeds finds a proportionally greater space in which to expand, thus achieving the effect of extending the exhaust stroke.

The object of this invention is an engine of special design, wherein the compression ratio varies with the quantity of mixture taken in by the engine, thus tending to obtain a substantially constant compression which, together with the effect of increased efficiency resulting from the increased relative length of the expansion stroke, substantially improves the efficiency of the internal combustion engine at all speeds.

Such a result is obtained, according to the invention, with a rotary engine comprising a stator and a rotor. The latter carries a number of radial cavities in which slide as many pistons. According to a preferred solution, the stator body carries a pair of parallel profiles, suitably shaped to determine, as the rotor revolves, the stroke motion of the pistons, each of which, being approximately as long as the rotor, rests upon the said profiles through two series of aligned rollers which drive the pistons and cause them to carry out a reciprocating motion. The rollers sliding upon the internal surface of the stator are mounted on a carriage which slides lengthwise upon the actual body of each cylinder, so as to permit other rollers, with their internal movement, to travel over other guides which, being shaped in steps of different height, vary the stroke of the pistons.

Since, in the engine according to the invention, the piston strokes do not depend upon the conventional crank and rod arrangement, it can be understood that it is possible, in addition to obtaining a variable compression ratio, to have the expansion stroke vary with respect to the intake stroke, either by extending it when it is desired to make full use of the action of the gases, or by interrupting it at a given point when it is desired to use the kinetic energy of the said gases to power a gas turbine, this being done by simply changing the shape of the expansion cam.

This could be useful, for instance, in the application of the engine to gas turbines, as a substitution for static combustion chambers, whereby full use would be made of the work obtainable from the fall of the pressure from the maximum explosion value to the normal value of exhaust towards the jet or turbine, thus obviating the need for the first turbine coupled to the compressor. Before being used in the turbine or jet, the combustion gases will have to be further diluted with secondary cooling air.

Another special advantage of the engine according to this invention is that of creating the ideal condition for the explosion cycle, i.e. obtaining a combustion at constant volume, a result which is far from being achieved in the conventional engines, wherein an attempt is made to approximate it by advancing the ignition, a measure which by itself causes losses of efficiency.

A further advantage of the engine described herein is that of permitting the complete scavenging of the cylinder after each combustion phase, because in the four-stroke cycle as well a certain quantity of burned gases remains in the combustion chamber and causes a loss in volumetric efficiency.

Other advantages of the invention will be evident from the following detailed description, which will be more easily understood by referring to the enclosed drawings, which represent, as a non-limiting example, a preferred embodiment of this invention.

In the drawings:

Fig. 1 is a perspective outside view of the engine;

Fig. 2 is a perspective view of the engine with its various components: cylinder closing plates, head covers, pistons and piston seals. For the sake of clarity, the various parts are shown separated, but in the position in which they fit together;

Fig. 3 is a view of the roller carriage of a piston;

Fig. 4 is a view of the control for the axial movement of the rollers on the compression-variation control cams;

Fig. 6 is a lengthwise cross-section of the engine, taken on the horizontal plane VI—VI of Fig. 5;

Figs. 7 and 7A are perspective views of the two stator end plates;

Fig. 8 represents a variant of the rotor head plates.

Figure 5:
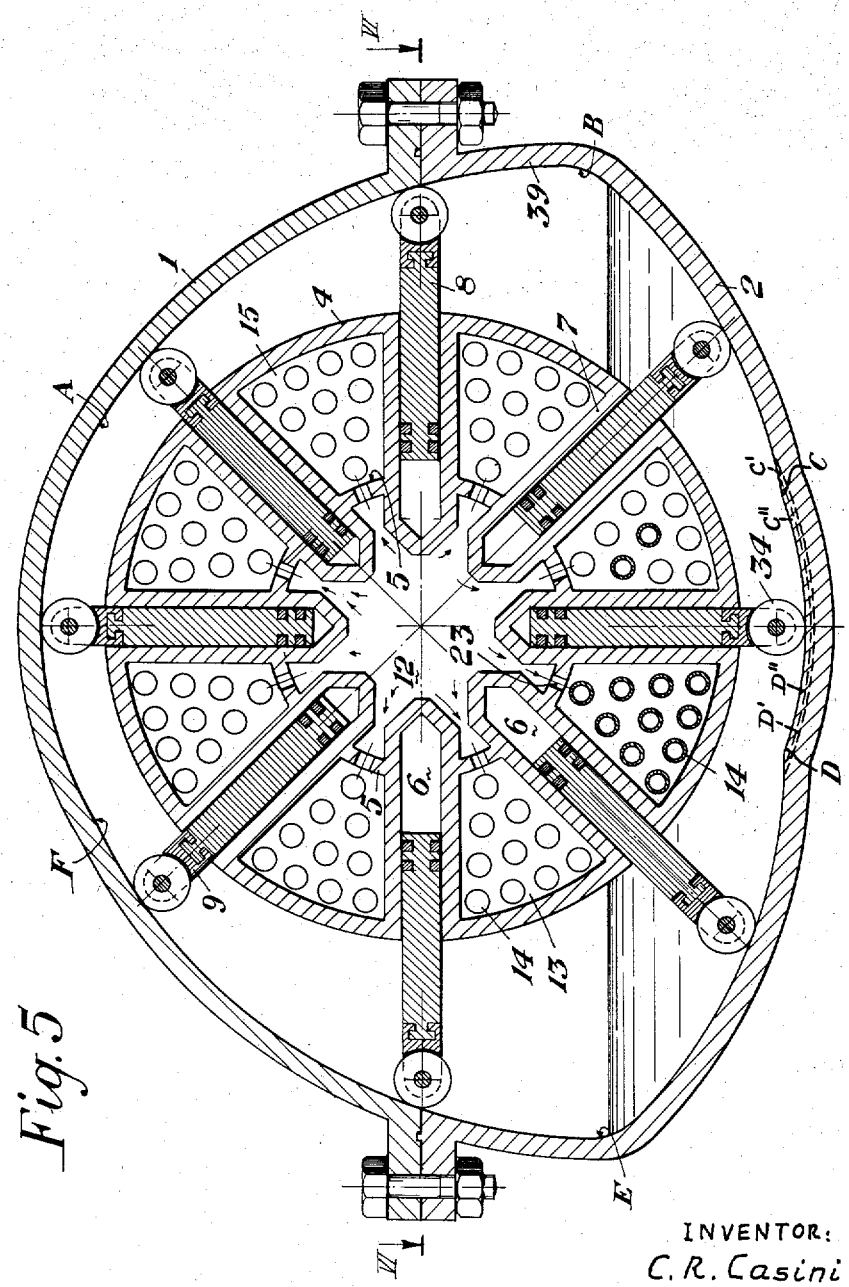
Fig. 5 is a cross-section view of the engine, taken perpendicularly to the axis.

With reference to the figures, the engine comprises a stator consisting of two housings 1 and 2 fastened together by a number of bolts 10 passing through the flanges with which the edges of the housings are fitted. The said two housings form an inner cavity which houses the rotor 3. The latter is a cylindrical body formed by two concentric drums 4 and 5 (Fig. 5), carrying radially a number of cavities 6 the walls 7 of which extend parallel to the axis for the entire length of the rotor, each of which houses an elongated block 8 ending in the outer part with a dovetail or similar groove 9. In the following part of the description, the cavities 6 will be referred to as "cylinders" because of their functional similarity to engine cylinders, and for the same reason the blocks sliding in the said cylinders will be referred to as "pistons."

In the example illustrated in the drawings there are eight pistons and cylinders, symmetrically distributed around the rotor.

The cylinder walls 7 do not extend to the center of the rotor, thus leaving a central cavity 12 which extends over the entire length of the rotor.

Likewise, eight more cavities 13 inside the rotor are provided between the concentrical cylinderical walls 4 and 5 and the walls 7—7 of two adjacent cylinders. In this cavity is housed lengthwise a number of lengthwise tubes 14, parallel to the axis of the rotor. On both ends of the rotor these tubes fit against two plates 15—15' (Fig. 2), which constitute the heads thereof and laterally enclose the cylinders 6, so that the pistons sliding therein are sealed against all four perimetral walls of the cylinders, i.e. on the walls and the inner faces of the plates 15, the sealing being also effected by means of one or more rows of sealing bands 16 fitted into suitable cavities.

These seals can be constructed according to known designs, but preferably each of them will consist of four parts, each part covering one fourth of the perimeter of the piston 8. The ends of each part are joined to that of the adjacent part. To ensure the adhesion of the seals 16 against the walls whereon they must slide, springs can be fitted underneath, or the gases under pressure in the cylinder can be made to act against their inner face.

Fastened to each of the rotor end plates 15—15' are the hollow shafts 20 and 20', which constitute the engine shaft. The said end plates also have holes 14' into which fit the ends of the said tubes 14, which are housed in the eight rotor cavities 13.

The end plates 15—15' also have eight ports 22 shaped according to the size, form and position of the cylinder chamber at the end of the compression and full intake stroke. Plates 15—15' are fastened to the rotor by means of screws 19 and, in operation, they fit against the inner faces of the stator end covers 24—24', which in turn are fastened to the stator by means of a number of bolts 25 through the end-plate and stator flanges.

The two identical end covers 24—24' have two large symmetrical ports 26 positioned against the holes 14' in the plates 15—15', and in the center they are fitted with a hub 27 through which extends the engine shaft 20—20'. In this hub are three ports 28, 29 and 30 corresponding to the ports 22 in the end plates 15—15', so that, as the rotor revolves, the passing of ports 28, 29 and 30 opposite each of the ports 22 will connect successively the interior of each cylinder with the ducts leading to the said ports, which are respectively the exhaust, scavenging and intake ports.

Since, by construction, the ports in the plates 15—15' are aligned and the ports 28, 29 and 30 symmetrically positioned on the right and left stator end covers, the intake, scavenging and exhaust of each cylinder will take place simultaneously at both ends thereof.

To allow the passage of gases from the inner part of the cylinders into the various ducts and vice versa, seals 32 are provided around each of the ports 22, in good fit against the inner surface of plates 24—24'. The fit of the seals 32 against the hub 27 is obtained in the same manner as the fit of the seal bands 16.

As it can be seen from Fig. 5, the inner profile of the stator consists of a number of curves of different radii, upon which rest the piston heads, which are thereby driven into a reciprocating motion which is not only wholly independent of the conventional crank and rod arrangement, but can also be previously calculated in accordance with the laws of thermo-dynamics.

In order to enable the heads of each piston to travel against the stator profile, the said heads are fitted, as indicated above, at their outer end, with a dovetail or other groove 9 which fits into a matching tongue 9' of a roller carriage 33 (Fig. 3), on which are mounted rollers 34 which rest upon the inner surface 39 of the stator.

Other rollers 35 rest upon a cam 40 provided upon the inner face of each of the cover plates 24 and 24', while an additional pair of rollers 36 is provided on the same carriage 33 to guide the same in a direction parallel to the engine shaft, as described below.

The profiles 39 and 40 are strictly parallel, and the pistons are caused by rollers 34 and 35 to carry out reciprocating motion due to the eccentric design of the pair of profiles 39 and 40.

Considering profile 39 (Fig. 5) as the piston guiding profile, we can divide its perimeter into the following sections: A—B, corresponding to the mixture intake phase; B—C, mixture compression phase; C—D, combustion stage; D—E, expansion or power stage. There follows section E—F, during which the burned gases are exhausted. In the last section F—A, back to the starting point A, the scavenging of the cylinder takes place as described below.

Some of these phases need individual explanation because they substantially differ from the action which takes place in any other type of internal combustion engine. In particular, the combusion phase which takes place in the profile section C—D occurs at a strictly constant volume, because this profile is an arc of circle centered on the center of rotation of the engine shaft.

However, as indicated in the preamble, the engine according to the invention affords the possibility of changing the compression ratio in proportion to the real intake volume. Provision is made, for instance, for re-establishing the full-intake compression ratio at 75% and 50% of the piston displacement.

To obtain mechanically these operating conditions, in the C—D section three different parallel profiles are provided, designated respectively as C—D, C'—D', and C''—D''. A mechanical or electric device actuated by the foot throttle shifts the carriage 33 in a direction parallel to the engine shaft, onto the profile step corresponding to the engine intake volume.

In the example, this device consists of a lever 42 with its fulcrum in the pivot 46, fastened to cover plate 24. This lever, actuated by a rod 44 pushes, by means of pins 45, another lever 43, housed in the section A—B of a cavity in the thickness of the cover plate 24' so that, when roller 36 passes opposite it, the latter, running over the ramp 43 from the lowest point at fulcrum 47 to the highest point which is the farthest from the inner face of cover plate 24', shifts the carriage 33 to the position in which each of the rollers 34 will run on the step corresponding to the desired compression ratio. The two levers 42—43 form, by means of pins 45, an articulated parallelogram. Opposite the parallelogram described above, an identical one is fitted to cover plate 24, as shown in Fig. 4. The two control rods, 44 and 44', are connected on the outside by a yoke which moves them simultaneously. The movements of the carriage 33 take place without causing any side stress on the cylinders 8, because the dovetail arrangement 9—9' permits the movement of the said carriage with respect to the cylinder head without appreciable friction.

The cooling of the engine described above is effected by a double circulation of water and air.

Water is pumped into the hollow engine shaft 20—20' by means of a pump of any known and suitable type. This water fills the inner rotor cavity 12, into which project the cylinder ends 7. The water flows through the cavity 12 in a substantially axial direction until it encounters a baffle 50 perpendicular to the axis of the engine, which forces it to flow through the holes 23 and into the chambers 13 which, as indicated above, are crossed by the tubes 14 through which air passes. Beyond the baffle 50 the water flows back from the chambers 13 to the cavity 12 through the holes 23, and then is discharged through the hollow shaft to be sent, if necessary, to a cooling radiator.

The air that flows axially through the tubes 14 is driven by a fan 52, and will be preferably driven at a slight pressure into a closed chamber connected with one of the engine heads. In any case, the air will reach the tubes 14 through the ports 26 of the stator cover plates 24 and 24'.

The cooling can be done by air only. In that case, the plates 15 and 15', instead of the holes 14' have ports of the same shape and on the same alignment as the internal rotor cavities 13 which, being completely free from tubes 14, are crossed over their full length by the air current generated in any of the manners referred to above. In this case the baffle 50 is not provided. With this arrangement, the port in the plate 15 ahead of the air flow will be preferably larger than that located behind, in order to transform into pressure a part of the energy of the air, so as to force the latter to flow, through the holes 23 into the cavity 12, joining the air let directly into this cavity through the shafts 20—20'. Cooling fins can be provided parallel to the air flow.

Based on the above description, the operation of the engine appears obvious.

With special reference to Fig. 5, let us consider the piston the rollers of which are tangential to stator curves 39 and 40 from position A to position B, in clockwise rotation. In this stroke the mixture from the carburetor is taken in through the ports 30 in stator end plates 24 and 24', aligned with each other.

In the stroke from B to C the piston, after having reached the top dead center, retracts and, all ports in cover plates 24 and 24' being closed, compresses the mixture within the fully retracted into the cylinder. At point C, two spark plugs 55 on both cylinder heads ignite the mixture, the combustion process taking place at constant volume because the profile 39 in the C—D section on which run the rollers 34 is an arc of circle centered on the engine axis. The combustion phase ends at point D, whereupon starts the expansion which runs from D to E, after which the cylinder passes opposite the pair of ports 28 through which the gases are exhausted. This phase occupies the profile section E—F. Continuing further in its rotation, the cylinder becomes aligned between ports 29—29' in cover plates 24—24'. The air flow which runs from one cover plate to the other causes a powerful scavenging of the cylinders, removing the combustion products left in it before a new cycle starts. This occurs in the last phase of the cycle, corresponding to section F—A. In this section too the action takes place at constant volume, because it is an arc of circle centered on the engine axis.

As indicated above, the stator is fitted with two or more stepped profiles within the constant-volume combustion phase C—D, so that the compression ratio can be set at a value suited to a given degree of filling of the cylinder.

Since the sidewise shifting of the rollers of the carriage 33 will naturally have to be done before the piston reaches the stepped section C—D, it would be sufficient for the guide 43 to be positioned so as to actuate the carriage shift immediately before reaching point C, but because in the area where the mixture is compressed the cylinder is under strong radial stress, it is preferable for the shift to be done at a more suitable point, since the position of the roller carriage is wholly immaterial at any point of the profile except on the stepped part.

The carriage-shift guide 43 is preferably positioned in such a way that the sidewise shift is done during the intake phase, i.e. in the profile section A—B, since the piston pressure is the lowest in this section.

The engine described above can operate also with direct fuel injection. Injector nozzles can be provided in the place of the spark plugs, and instead of taking in mixture, air will be added.

Lubrication is effected as follows: Seals 32 receive oil under pressure through small ducts fed by the oil pump through the thickness of the hub walls. The rollers and cams are lubricated in an oil bath contained in the lower part of the stator. The piston sealing bands are lubricated by the drop of oil down the cylinder walls.

Constructional variations of the engine described above will be covered by this invention to the extent that they embody the same novel concepts described herein to achieve the same results.

In particular a variation which can assume a considerable importance in the operation of the engine consists to invert the function of the rotor with that of the stator, thus keeping fixed the internal hollow cylindrical body, while the external housing 1—2 revolves being duly statically and dynamically balanced.

With this arrangement the pistons as well as all other reciprocating masses in the engine would not be affected by centrifugal force. The cycle would take place without any variation with respect to the one described above, since the different phases do not depend on the provision of particular distribution means, but on the reciprocal relative position of stator and rotor, which position remains the same even if the said characteristic parts of the engine exchange their functions.

What I claim is:

1. A device for selectively converting the motion of a rotary internal combustion engine for the Otto cycle; said device comprising at least one profile consisting of a mixture intake section, a mixture compression section, a combustion section and an expansion section, said sections being curved and following each other in the order named, the curvature of said combustion section being that of an arc of a circle the center of which coincides with that of the rotary engine, and at least one other profile consisting of a curved combustion section and located parallel and adjacent to the combustion section of the first-mentioned profile, the curvature of said other profile being that of an arc of a circle having the same center as but a different radius from that of the first-mentioned circle.

2. A device in accordance with claim 1, said device comprising in combination with engine pistons having grooves formed therein, a roller carriage engaging said groove and slidably carried by said pistons, rollers carried by said roller carriage and engaging one of said profiles, and means engaging said roller carriage to shift said roller carriage and move said rollers in engagement with the other one of said profiles.

3. A device for selectively converting the motion of a rotary internal combustion engine for the Otto cycle; said device comprising two radially spaced parallel profiles, each of said profiles consisting of a mixture intake section, a mixture compression section, a combustion section and an expansion section, said sections being curved and following each other in the order named, the curvature of said combustion section being that of an arc of a circle the center of which coincides with that of said radial cylinders, at least one third profile consisting of a curved combustion section located parallel and adjacent to the combustion section of one of the first-mentioned profiles, the curvature of the third profile being that of an arc of a circle having the same center as but a different radius from that of the first-mentioned circle.

References Cited in the file of this patent

UNITED STATES PATENTS

| | | |
|---|---|---|
| 1,079,011 | Kaessmann | Nov. 18, 1913 |
| 1,088,623 | Ragot | Feb. 24, 1914 |
| 1,355,451 | Carpenter | Oct. 12, 1920 |
| 1,673,968 | Wasmundt | June 19, 1928 |
| 1,853,563 | Hungerford et al. | Apr. 12, 1932 |